(12) United States Patent
Rajasankar (10) Patent No.: US 9,904,447 B2
(45) Date of Patent: Feb. 27, 2018

(54) UNIVERSAL INKING SUPPORT

(71) Applicant: Microsoft Technology Licensing, LLC, Redmond, WA (US)

(72) Inventor: Sushanth Rajasankar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 14/991,494

(22) Filed: Jan. 8, 2016

(65) Prior Publication Data

US 2017/0199653 A1 Jul. 13, 2017

(51) Int. Cl.
| | |
|---|---|
| *G06F 3/0484* | (2013.01) |
| *G06F 3/0488* | (2013.01) |
| *G06F 3/0485* | (2013.01) |
| *G06F 3/0354* | (2013.01) |
| *G06F 17/24* | (2006.01) |
| *G06T 3/60* | (2006.01) |
| *G06T 3/20* | (2006.01) |

(Continued)

(52) U.S. Cl.
CPC ...... *G06F 3/04845* (2013.01); *G06F 3/03545* (2013.01); *G06F 3/0416* (2013.01); *G06F 3/0485* (2013.01); *G06F 3/04883* (2013.01); *G06F 9/4443* (2013.01); *G06F 17/242* (2013.01); *G06T 3/20* (2013.01); *G06T 3/40* (2013.01); *G06T 3/60* (2013.01); *G09G 5/377* (2013.01)

(58) Field of Classification Search
None
See application file for complete search history.

(56) References Cited

U.S. PATENT DOCUMENTS

| | | |
|---|---|---|
| 7,218,783 B2 | 5/2007 | Bargeron et al. |
| 7,574,048 B2 | 8/2009 | Shilman et al. |
| | (Continued) | |

OTHER PUBLICATIONS

Shilman, et al., "Recognizing Freeform Digital Ink Annotations", In Proceedings of 6th International Workshop on Document Analysis Systems, Sep. 8, 2004, 12 pages.

(Continued)

*Primary Examiner* — Edward Martello
(74) *Attorney, Agent, or Firm* — Alleman Hall Creasman & Tuttle LLP (57) ABSTRACT

Examples are disclosed for using and tracking inking input applied to applications of a computing device. An example computing device includes a display, an input sensor configured to receive inking input, a processor, and a storage device storing instructions executable by the processor to receive visual frames from an executing application indicating displayed content for the executing application, and, present displayed ink on a first location of the display based at least on an inking input received via the input sensor. The instructions are further executable to detect a change in the displayed content for the executing application based at least on a comparison of two or more of the visual frames from the executing application, determine a second location of the displayed ink on the display based at least on the change in the displayed content, and present the displayed ink in the second location of the display.

20 Claims, 9 Drawing Sheets

(51) Int. Cl.
*G06T 3/40* (2006.01)
*G06F 3/041* (2006.01)
*G09G 5/377* (2006.01)
*G06F 9/44* (2018.01)

(56) References Cited

U.S. PATENT DOCUMENTS

| | | | |
|---|---|---|---|
| 2005/0289452 A1 | 12/2005 | Kashi et al. | |
| 2006/0221064 A1* | 10/2006 | Sawada | G06F 17/242 345/173 |
| 2008/0231635 A1 | 9/2008 | Saund | |
| 2009/0238461 A1 | 9/2009 | Koubaroulis et al. | |
| 2012/0201459 A1 | 8/2012 | Lin et al. | |
| 2012/0281020 A1 | 11/2012 | Yamamoto et al. | |
| 2014/0085184 A1 | 3/2014 | Vertegaal et al. | |
| 2014/0189486 A1 | 7/2014 | Yasoshima | |
| 2016/0004375 A1* | 1/2016 | Xiong | G06F 3/0418 345/173 |

OTHER PUBLICATIONS

Agrawala, et al., "DIZI: A Digital Ink Zooming Interface for Document Annotation", In Proceedings of 10th IFIP TC13 International Conference on Human-Computer Interaction, Sep. 12, 2005, 13 pages.

Taufer, Trent Alan, "ScreenCrayons: Using Screen Captures for Annotation and Research", In Master Thesis of Brigham Young University, Apr. 2007, 85 pages.

Wilkins, Ricardo, "Annotating Documents with the Surface Pro Tablet and Pen", Published on: Jul. 1, 2013 Available at: http://surfaceprobro.blogspot.in/2013/07/annotating-documents-with-surface-pro.html.

"Ardesia", Published on: Nov. 18, 2010 Available at: https://code.google.com/p/ardesia/.

"Will", Published on: Feb. 21, 2015 Available at: http://will.wacom.com/features.html#.

Sutherland, Craig, "vsInk: An Extensible Framework for Adding Digital Ink to Visual Studio", In Dissertation of University of Auckland, Oct. 2012, 51 pages.

"Microsoft Surface Hub" 2015 Microsoft. Retrieved on Jan. 8, 2016.14 pages. Available at: https://www.microsoft.com/microsoft-surface-hub/en-us.

"Write on the web" Windows Help. Retrieved on Jan. 8, 2016. 2 pages. Available at: http://windows.microsoft.com/en-us/windows-10/getstarted-write-on-the-web.

ISA European Patent Office, International Search Report and Written Opinion Issued in PCT Application No. PCT/US2016/068613, dated Mar. 14, 2017, WIPO, 10 Pages.

* cited by examiner

UNIVERSAL INKING SUPPORT

BACKGROUND

Some computing devices may have a touch-sensitive display or other interface to allow direct input to displayed content. The direct input may be performed via a user's hand, a stylus/pen, or other implement. Applications executed by the computing devices may react to the direct input in different manners.

SUMMARY

Examples are disclosed for supporting the use of inking input applied to any application of a computing device, even if that application does not include native support of inking input. An example computing device includes a display configured to present a user interface, an input sensor configured to receive inking input to the user interface including one or more of pen input and hand-based input, a processor, and a storage device storing instructions executable by the processor to receive visual frames from an executing application indicating displayed content for the executing application, and present displayed ink on a first location of the display based at least on an inking input received via the input sensor. The instructions are further executable to detect a change in the displayed content for the executing application based at least on a comparison of two or more of the visual frames from the executing application, determine a second location of the displayed ink on the display based at least on the change in the displayed content, and present, via the display, the displayed ink in the second location of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A through 3D show adjustments of presentation of displayed ink on an application responsive to changes in the displayed content of the application.

DETAILED DESCRIPTION

Computing devices may include a digitizer and/or other input sensor or controller capable of receiving pen or other touch input for inking (e.g., annotating) displayed content. However, typically, only a subset of the applications executed by a computing device may be configured to natively support such inking. For example, only some (or, in some cases, none) of the applications executable by the device may include functionality to receive, interpret, track, and/or present displayed ink as a representation of inking input. Accordingly, with such devices, a user may have no ability, or only limited ability, to annotate content displayed on the device.

In some prior attempts to address the above limitations, a separate inking mode may be provided on the computing device in order to capture any inking input directed to the device. In such an example mode, a representation of the inking input may be displayed as a separate layer from the underlying application. A screenshot of the current state of the displayed application, as well as the current state of ink overlaying the displayed application, may be captured in order to save a record of the ink. However, the ink may not be associated in a dynamic manner with the application or displayed features of the application. Accordingly, as a user scrolls/pans, zooms, rotates, or otherwise changes the displayed content in the application, the ink may not be updated in a way that changes with changes to the displayed content. Ink is typically provided in order to annotate particular displayed content, or to otherwise have a spatial relationship to the underlying content. Accordingly, such a lack of tracking between application content and displayed ink may detract from the user experience. Furthermore, a user may be required to manually enter a special inking mode, limiting the opportunity for spontaneous annotations.

The present disclosure provides universal inking support for nearly any application of a system and a method that addresses the above-described issues. For example, after receiving inking input and presenting displayed ink responsive thereto, the device may monitor an application window to which the inking input was directed in order to detect changes to displayed content. Responsive to detecting these changes (e.g., panning, scrolling, zooming, insertion/deletion of content, rotation, etc.), the system and method of the present disclosure adjusts a position of the displayed ink in order to realign the ink with the correct location of displayed content in the underlying application. Additional features will be described in more detail below. In this way, a user may simply begin providing inking input (e.g., via a pen/stylus, hand/finger, and/or other input mechanism) at any time and to any application in order to annotate displayed content of the system.

Figure 1:
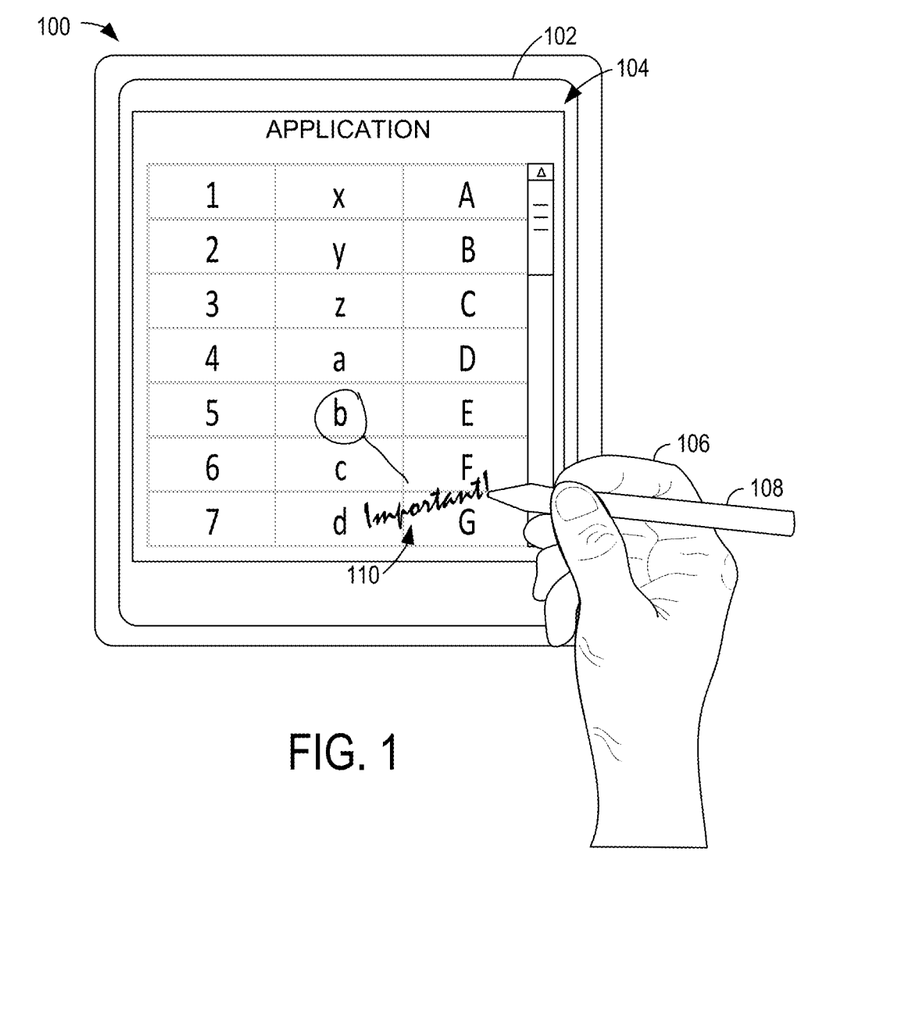
FIG. 1 shows an example of a computing device receiving ink input to a displayed application.

FIG. 1 shows an example computing device 100 configured to accept pen and/or hand/finger-based touch input for inking an application executed and/or displayed on the device. Computing device 100 includes a display 102, illustrated as presenting a user interface 104 of an application. The illustrated example shows a spreadsheet application, however any suitable application(s) may be presented via the display and inked as described. The user interface 104 may include all displayed content of the application and/or a portion of the displayed content of the application (e.g., where the user interface corresponds to an application window of an application, another application window may provide a different portion of the displayed content for the same application). As used herein, a user interface may also refer to all or a portion of displayed or displayable content presented on a display (e.g., a user interface for an operating system and/or for any executing applications). The illustrated example also depicts the computing device 100 as a tablet, smart phone, or similar mobile device. However, computing device 100 may encompass any device capable of receiving inking input from an input device. For example, computing device 100 may include a desktop or laptop computer, a head-mounted computing device, and/or other device including/communicatively coupled to a trackpad, mouse, camera (e.g., for recognizing gestures), microphone (e.g., for recognizing voice commands), and/or other suitable input device. Any of the above-described input devices may be used for providing the inking input to generating the inking described herein. In another example, computing device 100 may include a large-format and/or wall-mounted display with an integrated touch sensor, digitizer, and/or other input sensor for collaborative activities.

A user's hand 106 is illustrated in FIG. 1 holding an input device 108. Although a pen/stylus is illustrated as the input device 108 in the example of FIG. 1, any suitable input device, including a finger or other suitable object, may be utilized to provide inking input to the computing device 100. The input device 108 is shown providing inking 110 to the user interface 104 in the form of marking a displayed feature of the application (e.g., circling the "b") and writing a note (e.g., the text "Important!"). As used herein, the term ink or inking may refer to annotations to displayed content, such as those illustrated in FIG. 1, or other additional content presented on a display to represent marks/strokes made by an input device. Such ink may include hand-drawn shapes, connectors/arrows, handwritten text, and/or other suitable displayable elements presented as a representation of inking input provided via the input device. In the illustrated example, inking input may be provided via direct touch input (e.g., from a finger, pen/stylus, or other input device) to a touch-sensitive sensor integrated with the display 102. In other examples, inking input may be provided by another suitable manner, including but not limited to hover input within a threshold distance of the display, pen or finger/hand-based touch input to a graphics tablet or other writing surface coupled to the computing device, gesture input captured by a camera or other proximity sensor, mouse input, voice command, etc. In examples where the inking input is provided to an input sensor (e.g., a digitizer), the input sensor may be configured to detect the inking input using capacitive, optical, acoustic, pressure-based, and/or other physical or proximity touch detection techniques.

Figure 2A:
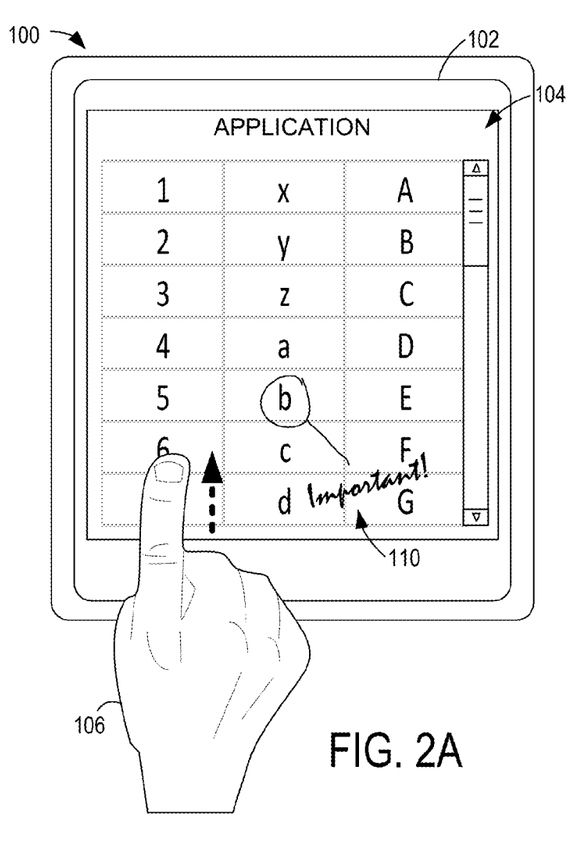
Figure 2B:
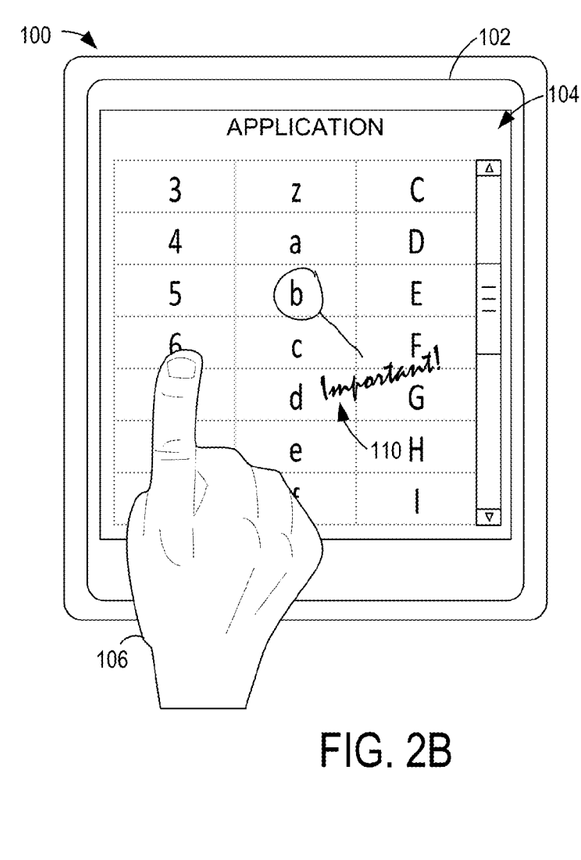

FIGS. 2A and 2B illustrate a way in which inking may be modified responsive to changes in the underlying application to which the inking was applied. In particular, FIG. 2B as an example shows the executing application of FIG. 2A after touch input is received via the hand 106 of the user to scroll or pan the application vertically. As shown, the rows of the spreadsheet are shifted upward during the scroll/pan operation. In this way, the visual state of the application is changed responsive to the scrolling/panning gesture/touch input. Likewise, the inking 110 is moved upward in order to maintain a position in which the entry "b" is circled (in the illustrated example). For example, the relative location of the inking 110 to the underlying application content may be tracked by determining an initial location of the inking, determining a change in location of the underlying application content, and then determining an updated location to which the inking may be moved responsive to the change in the underlying application content. As discussed above, other approaches to provide inking support for applications that do not support inking natively cannot track the changes in the displayed content of the application, so inking remains in its original location. For example, in such other approaches to providing inking support, the circle of the inking 110 would be positioned approximately around the "d" in the spreadsheet, rather than the "b" as illustrated. Accordingly, these other approaches may not allow inking to be input and tracked dynamically with an associated application.

Figure 3A:
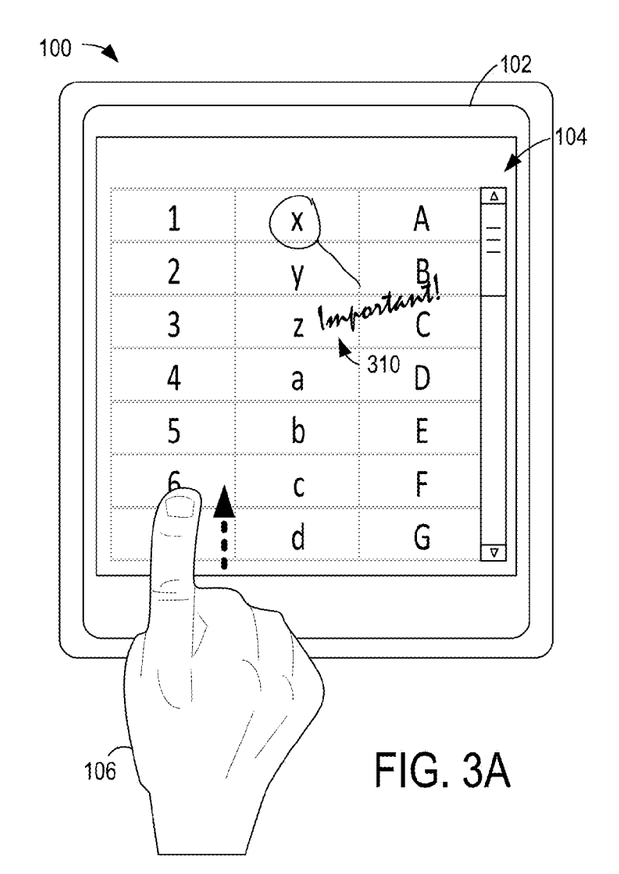

FIGS. 3A through 3D show an example in which the computing device 100 tracks a location of inking 310 even after the inking and associated displayed content of the application are shifted off-screen. In FIG. 3A, inking 310 is shown encircling spreadsheet element "x" in the top row of the spreadsheet. In response to input from the user's hand 106 to scroll the displayed content of the application downward (e.g., to pan the content upward), the top row of the spreadsheet (along with two other rows) is moved outside of the displayed region of the application, as shown by the dashed lines in FIG. 3B. Accordingly, this content, including the inking 310, is no longer displayed in FIG. 3B. However, the content and the associating inking may be stored in order to continue tracking the inking throughout future changes to the application content. For example, an association between the inking and distinct visual features of the rendered application content located near the inking may be stored and compared to displayed feature of the application content in order to detect the reappearance of content associated with the inking. Furthermore, a calculated location of the inking may be continually updated even while that location falls outside of a viewable range of an application window.

Figure 3B:
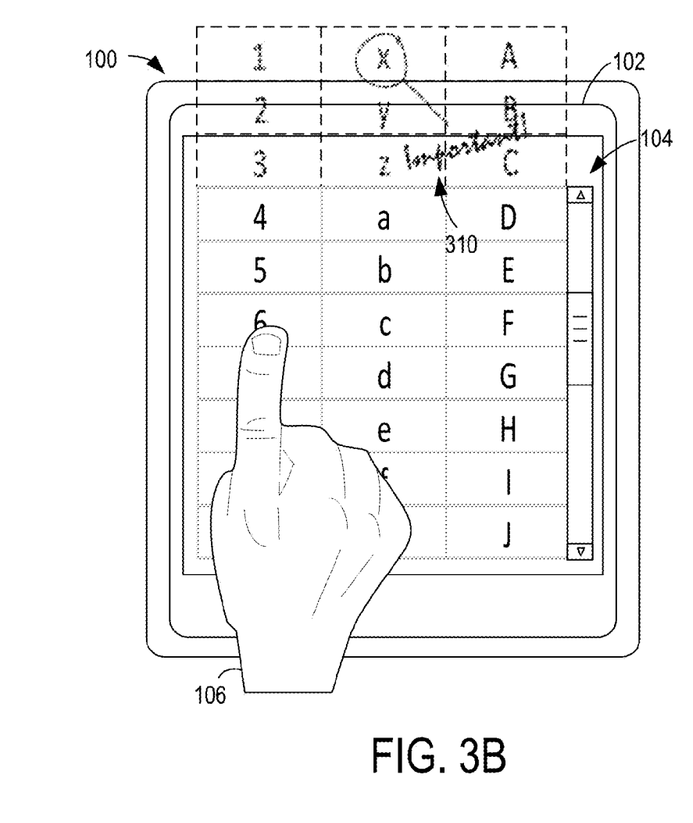
Figure 3C:
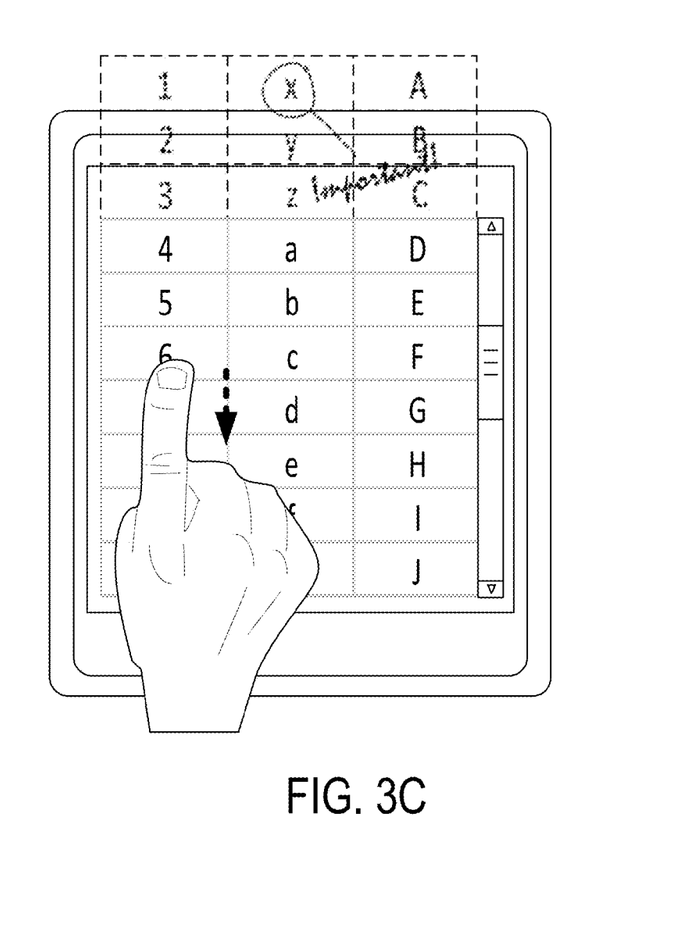
Figure 3D:
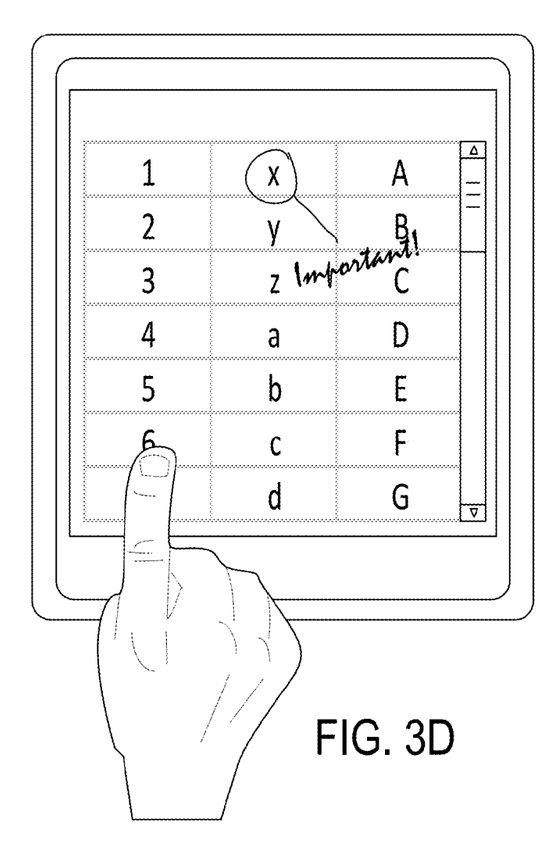

FIG. 3C shows the computing device 100 displaying the same content as FIG. 3B at a time when a scrolling/panning input is initiated in order to scroll up/pan down displayed content in the application. At FIG. 3D, the scrolling/panning input is completed such that the rows to which the inking 310 was applied are once again visible. Since the movement of the displayed content was continually tracked even while the inking 310 was off-screen as described above, the inking is once again displayed in connection with the associated rows of the spreadsheet coming back into view. In some examples, a snapshot of the displayed content of the application including the inking as shown in FIG. 3A (or as shown at some point during the scrolling/panning between the views shown in FIGS. 3A and 3B) may be saved to a file for later retrieval. For example, the inking may be saved in multiple incremental snapshots, such that an inking session may be recreated (e.g., in a video or animated format). The processing that allows the above-described inking behavior in applications that do not natively support inking will be described in more detail below with respect to FIGS. 4-6.

Figure 4:
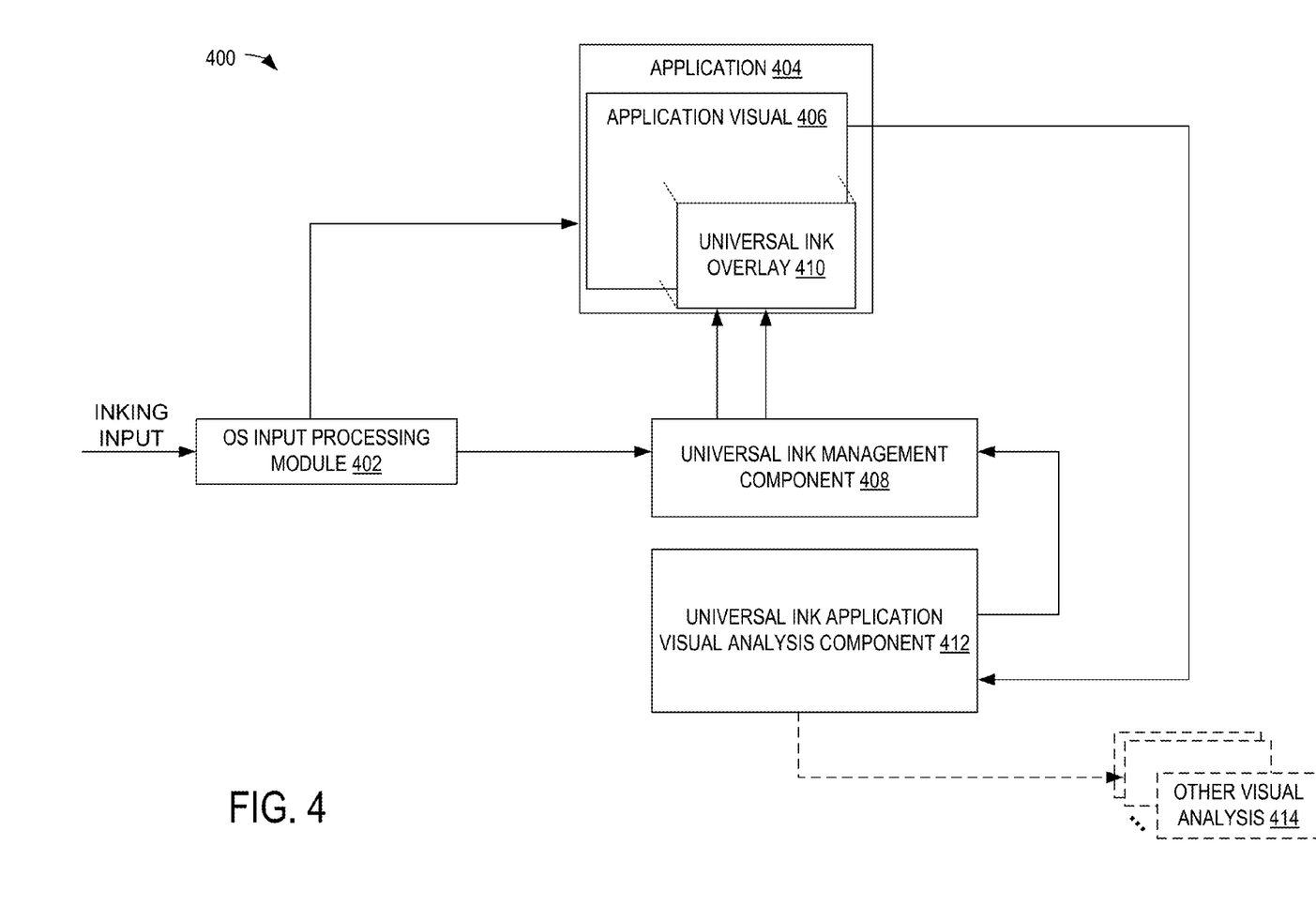
FIG. 4 shows a block diagram of example processing components in a computing device providing universal inking support.

FIG. 4 shows an example processing flow diagram 400 for handling inking input for applications of a computing device. For example, the processing blocks and data flow illustrated in FIG. 4 may be included in and/or performed by the computing device 100 of FIGS. 1 through 3C and/or any other suitable computing device. As illustrated, inking input (e.g., pen input) that is detected by a hardware input interface (e.g., a digitizer, touch sensor, and/or other input sensor) is provided to an operating system input processing module 402. The operating system input processing module 402 determines whether the application 404 to which the inking input is directed natively supports such inking input. For example, the operating system input processing module 402 may determine which application has focus (i.e., which of a number of application windows contains a cursor and is being actively used), compare a location of inking input relative to one or more displayed application windows, and/or perform any other suitable analysis to determine to which application the inking input is directed.

If the ink-receiving application 404 natively supports inking input, the operating system input processing module 402 sends the inking input directly to the application for processing by the application. For example, the operating system input processing module may not modify the inking input at all before passing it to the application, or may only perform some relatively minimal processing (e.g., encoding, decoding, etc.) to assist the application in receiving/interpreting the inking input. The application may then process the inking input and update an application visual 406 to include the inking input.

If the ink-receiving application 404 does not natively support inking input, the operating system input processing module 402 can send the inking input to a universal ink management component 408. The universal ink management component 408 may generate a displayed ink output based on and in response to the inking input. The inking may be rendered on a universal ink overlay 410, which is overlaid onto the application visual 406.

To ensure that inking input is adjusted as described above with respect to FIGS. 1 through 3D, a universal ink application visual analysis component 412 may evaluate frames of the application visual 406 to detect changes in displayed content thereon. For example, sequential application visual frames from application visual 406 may be provided to the visual analysis component 412 (e.g., together with or separate from displayed ink from the universal ink overlay 410) for analysis. The analysis may include comparing sequential frames (e.g., consecutive uninterrupted frames that are sent one after the other, or frames selected from a group of transmitted frames at a specified frequency or aperiodically) from the application visual in order to detect changes in the application visual under the universal ink overlay. The visual analysis component 412 may be implemented via hardware and/or software, using cores from one or both of a central processing unit (CPU) and a graphics processing unit (GPU), and/or any other suitable processing resource(s).

An example of changes that may be detected include panning or scrolling (e.g., translational movement), rotational movement, zooming (e.g., resizing), content insertion/deletion (e.g., which results in movement of other content on the visual), resolution/color/transparency changes, and/or other alterations in the appearance or location of all or part of the application visual 406. As ink overlaying the application may be tied to one or more distinct visual features of the rendered application content, detecting the changes in the content may enable the location/appearance of the ink to be adjusted to track such changes and maintain an association between the ink and the content. In some examples, input that causes such alterations (e.g., a scrolling input provided by a user) may be detected and passed to the visual analysis component 412 and/or another suitable processing component in the processing flow diagram 400 in order to trigger analysis and/or guide the analysis (e.g., the analysis to determine what type of motion/change is occurring and how much motion/change is occurring so that displayed ink may be properly transformed in line with such motion/change). For example, input indicating a scroll down command may guide the visual analysis component to look for translational changes in the visual frames from the application visual. In other examples, commands from an application (e.g., application 404 or another application that affects the appearance of application visual 406) may forward indications of commands that may result in changes of the application visual 406. In still other examples, visual analysis may be performed without knowledge of inputs causing the changes in the application visual.

The visual analysis component 412 may use any suitable analysis or combination of analysis tools in order to detect changes between frames of the application visual 406. In an example optical flow analysis to evaluate change between frames that are presented via a display, the visual analysis component 412 may apply spatial filtering or other adjustments to visual frames in order to facilitate the detection of changes in displayed content within the visual frames. For example, adjustments to the frames may emphasize edges of displayed objects in order to make the edges more readily identifiable, and/or otherwise enhance/diminish features of the frames to facilitate difference calculations between frames. During or after the optical flow analysis, the visual analysis component 412 may apply one or more computer vision or related algorithms to detect and determine properties of the changes between application visual frames. The algorithms may include Speeded Up Robust Features (SURF), scale-invariant feature transform (SIFT), blob detection, edge detection, corner detection, and/or any other suitable visual analysis tool. In some examples, the visual analysis component 412 may perform a first optical flow calculation to determine an amount of change between two application visual frames (e.g., an amount of movement or zooming of displayed content from one frame to the next). The visual analysis component 412 may then apply a template matching or other feature description analysis in order to locate feature points in each frame and measure a change between locations/appearances of those feature points. In some examples, the visual analysis component 412 may locate feature points associated with a location of ink in the universal ink overlay 410. The template matching or other feature description may be used to augment the optical flow analysis (e.g., which may only crudely detect movements of features in the displayed frames) and/or used in place of the optical flow analysis in some examples.

The universal ink application visual analysis component 412 may send data to the universal ink management component 408 indicating the determined changes in the application visual frames and/or a change rectangle (e.g., an indicator of an amount of the determined changes in the frames, such as a measure of a scroll offset determined from detected changes in the frames). The universal ink management component 408 may generate and/or send instructions to the universal ink overlay 410 and/or a related renderer to adjust ink visibility, scale, position, and/or other visible features of the ink based on the visual analysis of the application visual under the ink (e.g., as received from the visual analysis component 412).

The visual analysis component 412 may further send other visual analysis results to other visual analysis components 414 or related processing modules. For example, the visual analysis component 412 may detect a type of displayed content over which ink is presented (e.g., a text box). Such a detection may be used by another visual analysis component 414 to trigger an automatic process (e.g., automatic ink to text input conversion) based on the input from the visual analysis component 412.

Figure 5:
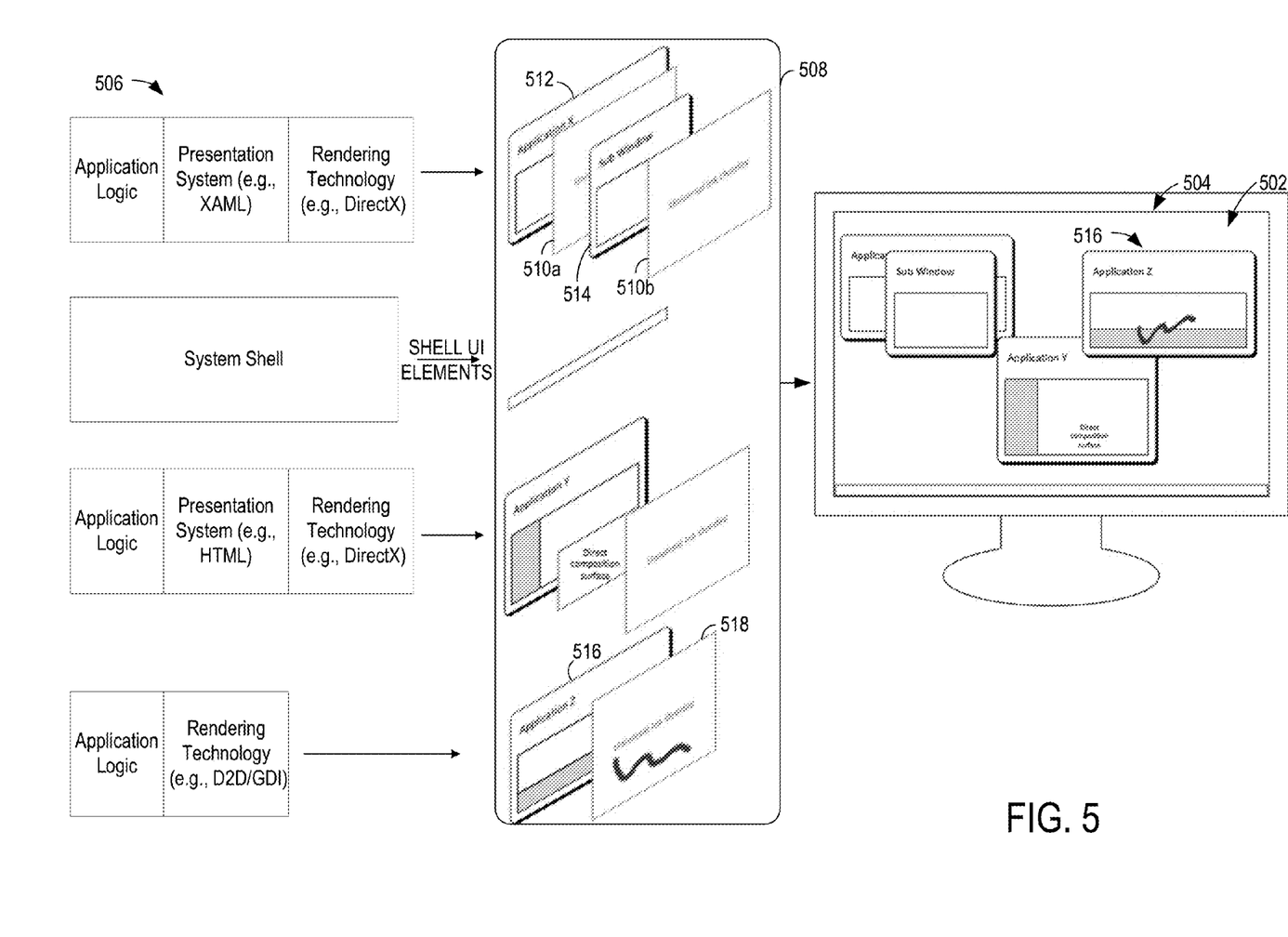
FIG. 5 shows a schematic representation of application window processing and universal ink overlay processing.

FIG. 5 schematically depicts the processing and rendering of application windows and universal ink overlays for a user interface 502 of a computing device 504. As illustrated, applications may use different technologies to produce visual content on screen. Accordingly, universal inking may not be as simple as adding base support to a single presentation system with or without using computer vision based analysis of output frames. Instead, the universal inking provided by the present disclosure works downstream on the output visuals from these disparate rendering systems, to provide inking support to all applications.

Components 506 represent processing components/technology that may be used to generate the associated application window that is rendered by a compositor 508 in the manner illustrated. The compositor 508 is a component of the operating system of device 504. It may maintain frames/textures for each application and compose them to generate the final visual frame that the user sees. The compositor has visual frames for each application, and knows when the visual frames are updated. The compositor is also the place from which visual frames for analysis can be obtained (e.g., provided to the visual analysis component 412 of FIG. 4) and where a universal inking layer (e.g., universal ink overlay 410 of FIG. 4) can be added in. Shown here is one inking layer (e.g., layer 510a or 510b) per window (e.g., window 512) or sub-window (e.g., sub-window 514); other implementations may use one inking layer for the entire screen in place of the individual inking layers or in addition to the individual inking layers. Further, in some examples, multiple inking layers may be used for a single window (e.g., each corresponding to a different region of the window, where the different regions may be designated based on types of content displayed in the regions in some examples).

In the depicted example, the layers composed by the compositor 508 are finally rendered as the various windows and associated displayed content illustrated within user interface 502 presented by device 504. For example, as only Application Z (window 516) has an associated universal ink overlay 518 with inking present, only Application Z has inking displayed over the associated application window in the display of device 504.

Figure 6:
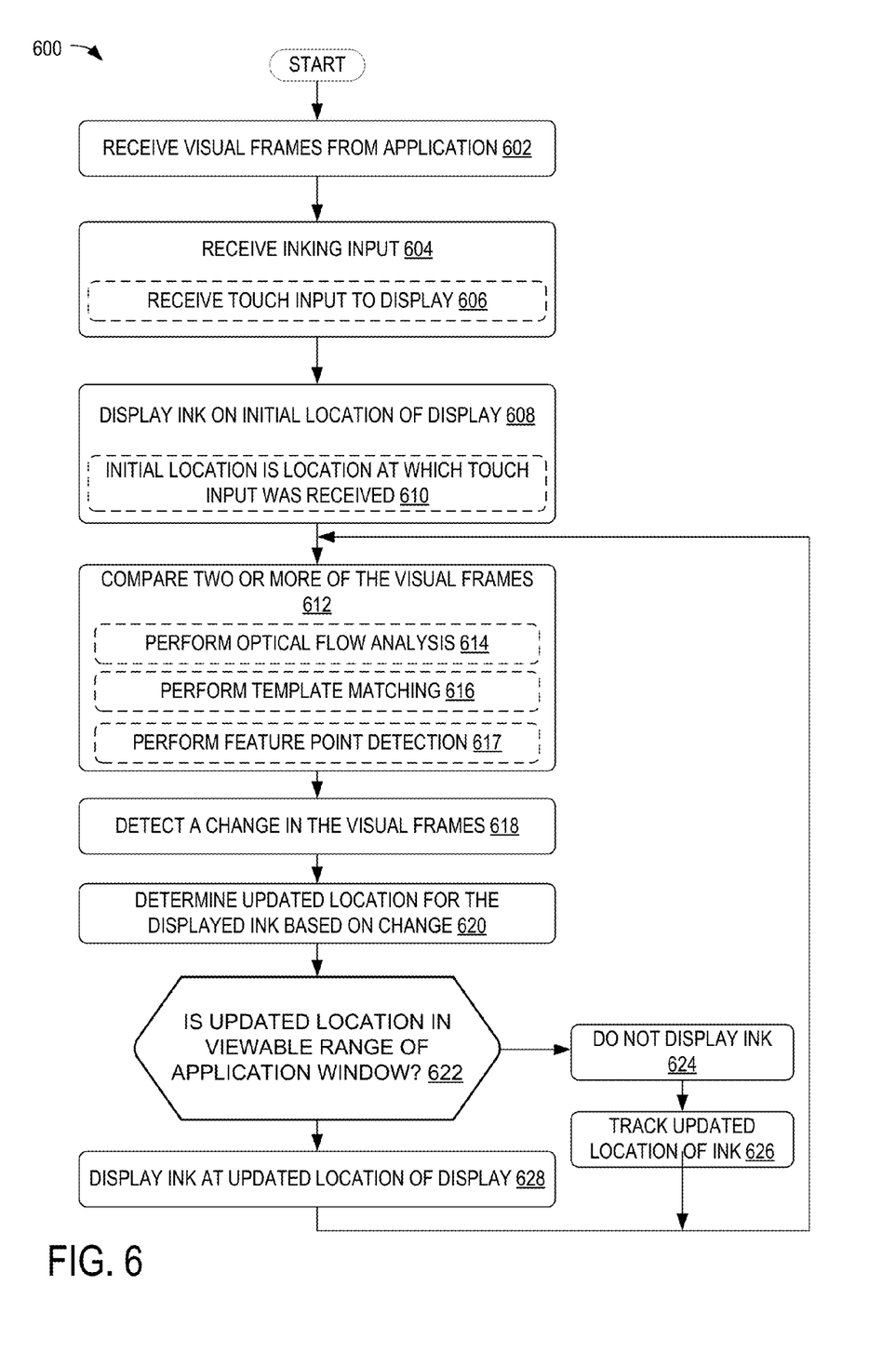
FIG. 6 is a flow chart of an example method of presenting and updating the presentation of ink over an application.

FIG. 6 is a flow chart of a method 600 for displaying and adjusting ink applied to applications on a computing device. Method 600 may be performed by any suitable computing device, including but not limited to computing device 100 of FIGS. 1 through 3D and/or a computing device including the processing components illustrated in FIGS. 4 and 5. At 602, the example method includes receiving visual frames from an executing application. For example, the visual frames may indicate displayed content for the executing application.

At 604, the method includes receiving inking input. For example, the inking input may include touch input made to a display, as indicated at 606, and/or any other suitable input associated with inking an application. At 608, the method includes displaying ink corresponding to the inking input on an initial location of the display. For example, if inking input is detected via an input sensor/digitizer, the displayed ink may be presented at a location of the display corresponding to a location at which the inking input was received, as indicated at 610.

At 612, the method includes comparing two or more of the visual frames. For example, the comparison may include performing an optical flow analysis, as indicated at 614, template matching (e.g., where a bitmap is captured and matched, by using a technique such as a sum of absolute difference), as indicated at 616, feature point detection (e.g., where distinct feature(s) are identified and a descriptor is built for that feature(s), then the same feature is searched for on the next frame using matching computer vision algorithms (e.g., SIFT/SURF)), as indicated at 617, and/or any other analysis to determine changes in an appearance of the application window and/or displayed content presented therein. The comparison may include determining, for the first frame, a relationship between a location and appearance of 1) one or more points of interest in the first frame, and 2) at least a portion of the displayed ink when the displayed ink is presented as an overlay of the first frame and determining, for the second frame, a new location and appearance of the one or more points of interest in the first frame. At 618, the method includes detecting a change in the visual frames (e.g., based on the comparison of the visual frames).

At 620, the method includes determining an updated location for the displayed ink based on the detected change. The updated location may be different from the initial location and may be shifted relative to the initial location by an amount and direction that is based on the movement/change in the displayed content. For example, if a feature point of the displayed content is detected as moving 100 pixels upward between a first visual frame and a second visual frame of the application, the updated location may correspond to a location that is approximately 100 pixels upward relative to the initial location of the ink. In some examples, the change in the updated location relative to the initial location may be calculated including an error estimation for the visual flow analysis. In additional or alternative examples, the updated location may be adjusted based on further analysis (e.g., based on identifying a relative location of the ink to one or more feature points in the displayed content and snapping the ink to the relative location as the one or more feature points move/change).

Figure 7A:
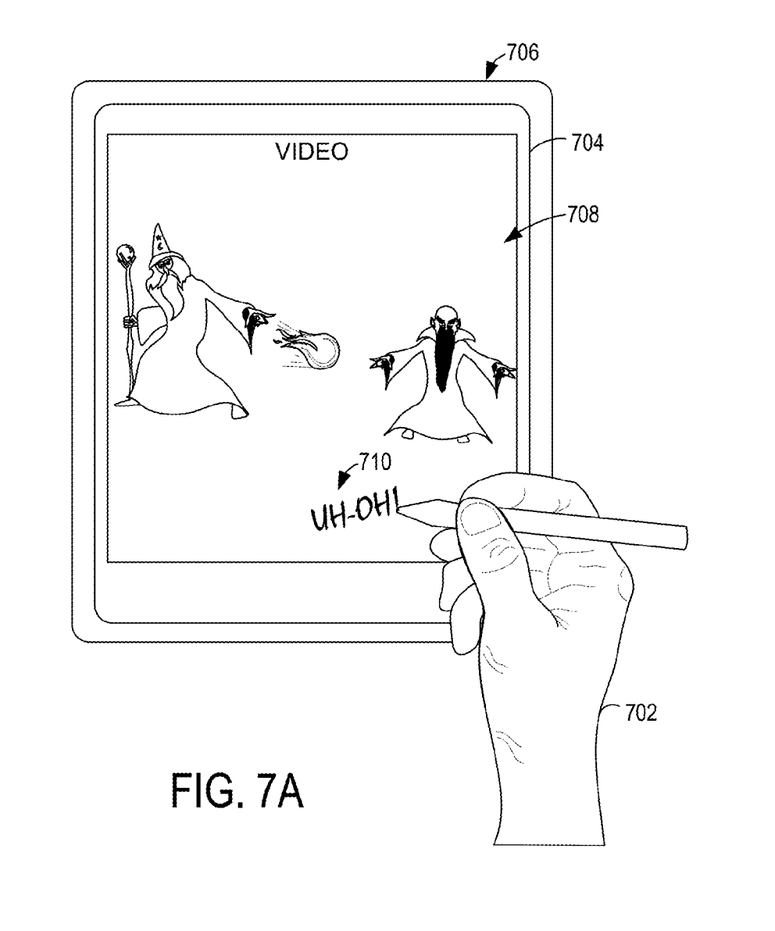
FIGS. 7A and 7B show a presentation of ink as applied to highly volatile displayed content of an application.
Figure 7B:
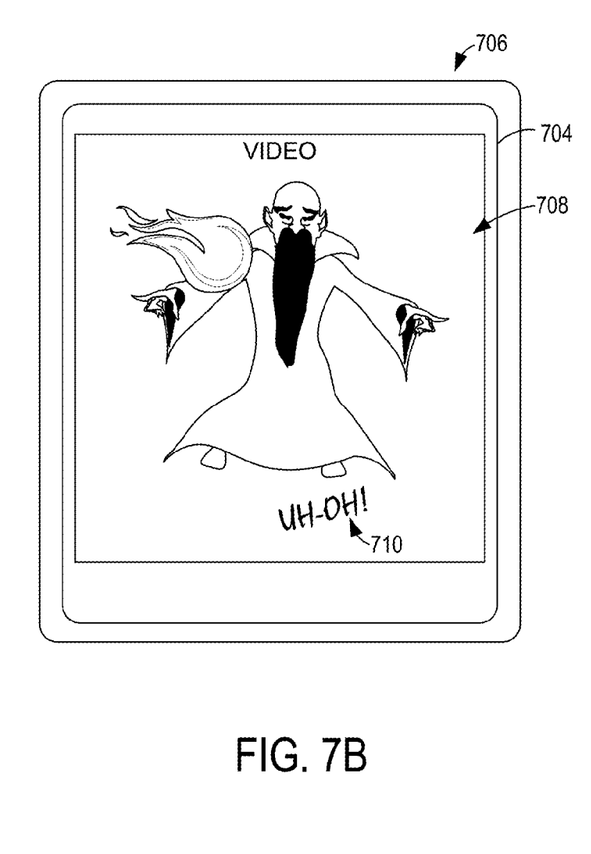

In some examples, the updated location may be the same as the initial location if the detected change exceeds a threshold. For example, if the displayed content in the application window changes too drastically or too frequently (e.g., above respective thresholds for these parameters), continually updating the position of the ink may be too resource intensive and may degrade an appearance of the ink (e.g., the ink may not be easily read if continually moved around the display by large amounts and/or at a high frequency). An example of such changes may correspond to the application presenting a video or other animated content. Such an example is illustrated in FIG. 7A. As shown, a user 702 may apply inking input to an input sensor and/or digitizer integrated with a display 704 of a computing device 706 while the display is presenting a video application 708. The inking input may provide the displayed ink 710 of FIG. 7A. As shown in FIG. 7B, even though the displayed content changed between the view shown in FIG. 7A and the view shown in FIG. 7B, the displayed ink 710 remains in the same location. In some examples, the displayed ink may remain in the same location until an application is terminated and/or until a user specifies removal of the displayed ink. In other examples, the displayed ink may remain in the same location until a threshold period of time and/or number of display content changes have occurred since the displayed ink was initially presented.

At 622, the method includes determining if the updated location is within a viewable range of the application window. For example, as shown in FIG. 3B, panning/scrolling input may cause displayed ink to be moved off-screen. If the updated location is not within the viewable range of the application (e.g., within a boundary of an application window associated with the ink) or an area determined to be the bounds of the element/control updating (one approach to determine the bounds of control scrolling may include determining a bounding box over the changed region and snapping it with edges detected as encompassing it in the original visual), the method proceeds to 624 to not display the ink and to 626 to track the updated location of the ink at this point and through future movements/changes of the displayed content of the application window. The method then returns to 612 to continue comparing visual frames and detecting changes in the displayed content within the visual frames. In some examples, if the ink occupies a location that is outside the viewable range of the application window for longer than a threshold period of time, the ink and associated underlying displayed content from the application may be saved to a file (e.g., as a composite image). In additional or alternative examples, a user may be provided an option to save the ink and underlying display content to a file (e.g., to export composite views of the application to share with others). Such composite images may be stored in a location on the computing device and stitched together to provide an oversized view of the displayed content of the application (e.g., more than a single window of the application displays in a given frame) with any applicable ink overlaid thereon.

Returning to 622, if the updated location of the ink is within a viewable range of the application window, the method proceeds to 628 to display the ink at the updated location of the display. The method then returns to 612 to continue comparing frames to detect changes in displayed content of the application.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
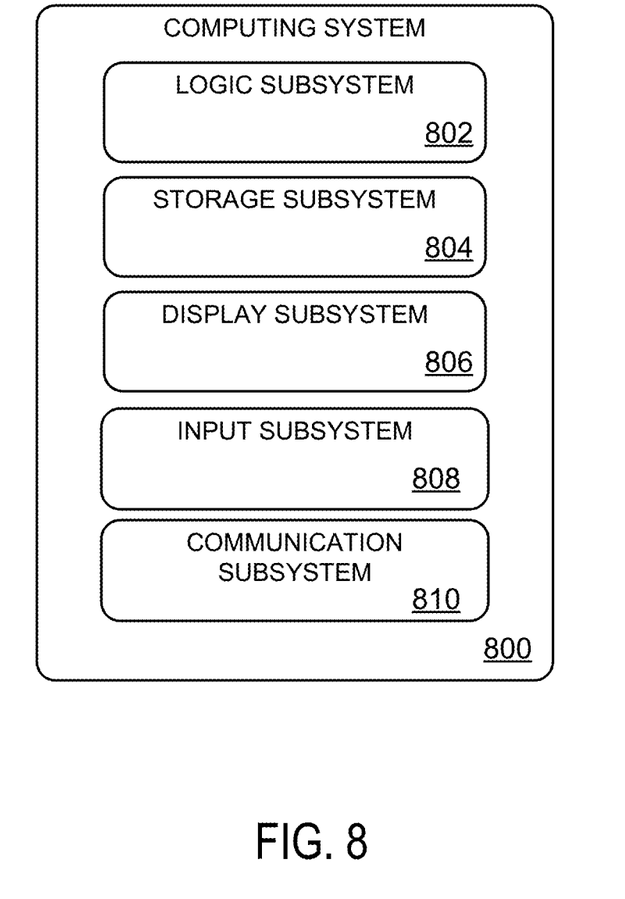
FIG. 8 is a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides for a computing device comprising a display configured to present a user interface, an input sensor configured to receive inking input to the user interface including one or more of pen input and hand-based input, a processor, and a storage device storing instructions executable by the processor to receive visual frames from an executing application indicating displayed content for the executing application, present displayed ink on a first location of the display based at least on an inking input received via the input sensor, detect a change in the displayed content for the executing application based at least on a comparison of two or more of the visual frames from the executing application, determine a second location of the displayed ink on the display based at least on the change in the displayed content, and present, via the display, the displayed ink in the second location of the display. In such an example, presenting the displayed ink in the second location may additionally or alternatively comprise generating a composite image including one of the visual frames and the displayed ink and rendering the composite image for display. In such an example, detecting a change in displayed content provided by the executing application may additionally or alternatively comprise detecting one or more of a pan, zoom, and rotation of at least a portion of the user interface, and wherein presenting the displayed ink in the second location may additionally or alternative comprise one or more of panning, zooming, and rotating the displayed ink based at least on a type of change detected in the displayed content. In such an example, the second location of the display may additionally or alternatively be determined based at least on a detected amount of movement of one or more features between a first frame of the two or more visual frames and a second frame of the two or more visual frames. In such an example, the second location of the display may additionally or alternatively be further determined based at least on performing one or more of template matching, optical flow analysis, and feature point detection/matching, including determining, for the first frame, a relationship between a location and appearance of 1) one or more points of interest in the first frame, and 2) at least a portion of the displayed ink when the displayed ink is presented as an overlay of the first frame, and adjusting the location and appearance of the displayed ink on the display to maintain the relationship for the second frame when the displayed ink is presented as an overlay of the second frame. In such an example, the instructions may additionally or alternatively be further executable to, responsive to detecting that an adjusted location of the displayed ink corresponds to the displayed ink being positioned outside of the displayed content for the executing application, store the relationship between the displayed ink and the one or more features and stop presenting the displayed ink, and perform off-screen adjustments of the location and appearance of the displayed ink based at least on a comparison of the visual frames while the displayed ink is positioned outside a range of the displayed content for the executing application and not presented via the display. In such an example, the instructions may additionally or alternatively be further executable to determine that the off-screen adjustments of the location and appearance of the displayed ink indicate that at least a portion of the displayed ink is positioned within the range of the displayed content for the executing application, and present at least the portion of the displayed ink based at least on the off-screen adjustments as an overlay of the displayed content of the executing application. In such an example, the instructions may additionally or alternatively be further executable to generate and store a file including one or more of 1) a stitched overall image of views observed during changes in the displayed content and 2) an animation of displayed ink presented over one or more views of the executing application. In such an example, the instructions may additionally or alternatively be further executable to maintain the displayed ink in the first location responsive to determining that the change in displayed content for the executing application exceeds a threshold amount of change between frames of the displayed content. In such an example, the instructions may additionally or alternatively be further executable to detect a type of displayed content over which the displayed ink is presented and performing an action based at least on the type of displayed content. Any or all of the above-described examples may be combined in any suitable manner in various implementations.

Another example provides for a method for a computing device, the method comprising receiving visual frames from an executing application of the computing device, the visual frames indicating displayed content for the executing application, in response to receiving an inking input via an input sensor of the computing device, presenting displayed ink on a first location of a display of the computing device, detecting a change in the displayed content for the executing application based at least on a comparison of two or more of the visual frames from the executing application, determining a second location of the displayed ink on the display based at least on the change in the displayed content, and presenting, via the display, the displayed ink in the second location of the display. In such an example, presenting the displayed ink in the second location may additionally or alternatively comprise generating a composite image including one of the visual frames and the displayed ink and rendering the composite image for display. In such an example, detecting a change in displayed content provided by the executing application may additionally or alternatively comprise detecting one or more of a pan, zoom, and rotation of at least a portion of the user interface, and presenting the displayed ink in the second location may additionally or alternatively comprise one or more of panning, zooming, and rotating the displayed ink based at least on a type of change detected in the displayed content. In such an example, the second location of the display may additionally or alternatively be determined based at least on a detected amount of movement of one or more features between a first frame of the two or more visual frames and a second frame of the two or more visual frames. In such an example, the second location of the display may additionally or alternatively be further determined based at least on performing one or more of template matching, optical flow analysis, and feature point detection/matching, including determining, for the first frame, a relationship between a location and appearance of 1) one or more points of interest in the first frame, and 2) at least a portion of the displayed ink when the displayed ink is presented as an overlay of the first frame, and adjusting the location and appearance of the displayed ink on the display to maintain the relationship for the second frame when the displayed ink is presented as an overlay of the second frame. In such an example, the method may additionally or alternatively further comprise, responsive to detecting that an adjusted location of the displayed ink corresponds to the displayed ink being positioned outside of the displayed content for the executing application, storing the relationship between the displayed ink and the one or more features and stop presenting the displayed ink, and performing off-screen adjustments of the location and appearance of the displayed ink based at least on a comparison of the visual frames while the displayed ink is positioned outside a range of the displayed content for the executing application and not presented via the display. In such an example, the method may additionally or alternatively further comprise determining that the off-screen adjustments of the location and appearance of the displayed ink indicate that at least a portion of the displayed ink is positioned within the range of the displayed content for the executing application, and presenting at least the portion of the displayed ink based at least on the off-screen adjustments as an overlay of the displayed content of the executing application. Any or all of the above-described examples may be combined in any suitable manner in various implementations.

Another example provides a computing device comprising a display configured to present a user interface, an input controller configured to receive inking input to the user interface, a processor in communication with the display and the touch controller, the processor configured to receive visual frames from an executing application indicating displayed content for the executing application, present displayed ink on a first location of the display based on at least an instance of inking input, detect a change in the displayed content for the executing application based at least on an optical flow analysis of two or more of the visual frames from the executing application, determine a second location of the displayed ink on the display based at least on the change in the displayed content, based at least on determining that the second location is outside of a viewable region of the executing application, remove the displayed ink and track an off-screen position of the displayed ink, and, based at least on determining that the second location is inside the viewable region of the executing application, present, via the display, the displayed ink in the second location of the display. In such an example, detecting a change in displayed content provided by the executing application may additionally or alternatively comprise detecting one or more of a pan, zoom, and rotation of at least a portion of the user interface, and presenting the displayed ink in the second location may additionally or alternatively comprise one or more of panning, zooming, and rotating the displayed ink based at least on a type of change detected in the displayed content. In such an example, the second location of the display may additionally or alternatively be determined based at least on performing one or more of template matching, optical flow analysis, and feature point detection/matching, including determining, for the first frame, a relationship between a location and appearance of 1) one or more points of interest in the first frame, and 2) at least a portion of the displayed ink when the displayed ink is presented as an overlay of the first frame, and adjusting the location and appearance of the displayed ink on the display to maintain the relationship for the second frame when the displayed ink is presented as an overlay of the second frame. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a display configured to present a user interface;
an input sensor configured to receive inking input to the user interface including one or more of pen input and hand-based input;
a processor; and
a storage device storing instructions executable by the processor to:
receive visual frames from an executing application indicating displayed content for the executing application;
present displayed ink on a first location of the display based at least on an inking input received via the input sensor;
detect a change in the displayed content for the executing application based at least on a comparison of two or more of the visual frames from the executing application;
determine, independent of receipt of any instructions from the executing application, a second location of the displayed ink on the display based at least on the change in the displayed content; and
present, via the display, the displayed ink in the second location of the display while removing such displayed ink from the first location.

2. The computing device of claim 1, wherein presenting the displayed ink in the second location comprises generating a composite image including one of the visual frames and the displayed ink and rendering the composite image for display.

3. The computing device of claim 1, wherein detecting a change in displayed content provided by the executing application comprises detecting one or more of a pan, zoom, and rotation of at least a portion of the user interface, and wherein presenting the displayed ink in the second location comprises one or more of panning, zooming, and rotating the displayed ink based at least on a type of change detected in the displayed content.

4. The computing device of claim 3, wherein the second location of the display is determined based at least on a detected amount of movement of one or more features between a first frame of the two or more visual frames and a second frame of the two or more visual frames.

5. The computing device of claim 4, wherein the second location of the display is further determined based at least on performing one or more of template matching, optical flow analysis, and feature point detection/matching, including:
  determining, for the first frame, a relationship between a location and appearance of 1) one or more points of interest in the first frame, and 2) at least a portion of the displayed ink when the displayed ink is presented as an overlay of the first frame, and
  adjusting the location and appearance of the displayed ink on the display to maintain the relationship for the second frame when the displayed ink is presented as an overlay of the second frame.

6. The computing device of claim 5, wherein the instructions are further executable to:
  responsive to detecting that an adjusted location of the displayed ink corresponds to the displayed ink being positioned outside of the displayed content for the executing application, store the relationship between the displayed ink and the one or more features and stop presenting the displayed ink, and
  perform off-screen adjustments of the location and appearance of the displayed ink based at least on a comparison of the visual frames while the displayed ink is positioned outside a range of the displayed content for the executing application and not presented via the display.

7. The computing device of claim 6, wherein the instructions are further executable to:
  determine that the off-screen adjustments of the location and appearance of the displayed ink indicate that at least a portion of the displayed ink is positioned within the range of the displayed content for the executing application, and
  present at least the portion of the displayed ink based at least on the off-screen adjustments as an overlay of the displayed content of the executing application.

8. The computing device of claim 1, wherein the instructions are further executable to generate and store a file including one or more of 1) a stitched overall image of views observed during changes in the displayed content and 2) an animation of displayed ink presented over one or more views of the executing application.

9. The computing device of claim 1, wherein the instructions are further executable to maintain the displayed ink in the first location responsive to determining that the change in displayed content for the executing application exceeds a threshold amount of change between frames of the displayed content.

10. The computing device of claim 1, wherein the instructions are further executable to detect a type of displayed content over which the displayed ink is presented and performing an action based at least on the type of displayed content.

11. A method for a computing device, the method comprising:
  receiving visual frames from an executing application of the computing device, the visual frames indicating displayed content for the executing application;
  in response to receiving an inking input via an input sensor of the computing device, presenting displayed ink on a first location of a display of the computing device;
  detecting a change in the displayed content for the executing application based at least on a comparison of two or more of the visual frames from the executing application;
  determining, independent of receipt of any instructions from the executing application, a second location of the displayed ink on the display based at least on the change in the displayed content; and
  presenting, via the display, the displayed ink in the second location of the display, while removing such displayed ink from the first location.

12. The method of claim 11, wherein presenting the displayed ink in the second location comprises generating a composite image including one of the visual frames and the displayed ink and rendering the composite image for display.

13. The method of claim 11, wherein detecting a change in displayed content provided by the executing application comprises detecting one or more of a pan, zoom, and rotation of at least a portion of the user interface, and wherein presenting the displayed ink in the second location comprises one or more of panning, zooming, and rotating the displayed ink based at least on a type of change detected in the displayed content.

14. The method of claim 13, wherein the second location of the display is determined based at least on a detected amount of movement of one or more features between a first frame of the two or more visual frames and a second frame of the two or more visual frames.

15. The method of claim 14, wherein the second location of the display is further determined based at least on performing one or more of template matching, optical flow analysis, and feature point detection/matching, including:
  determining, for the first frame, a relationship between a location and appearance of 1) one or more points of interest in the first frame, and 2) at least a portion of the displayed ink when the displayed ink is presented as an overlay of the first frame, and
  adjusting the location and appearance of the displayed ink on the display to maintain the relationship for the second frame when the displayed ink is presented as an overlay of the second frame.

16. The method of claim 15, further comprising:
  responsive to detecting that an adjusted location of the displayed ink corresponds to the displayed ink being positioned outside of the displayed content for the executing application, storing the relationship between the displayed ink and the one or more features and stopping presentation of the displayed ink, and
  performing off-screen adjustments of the location and appearance of the displayed ink based at least on a comparison of the visual frames while the displayed ink is positioned outside a range of the displayed content for the executing application and not presented via the display.

17. The method of claim 16, further comprising:
  determining that the off-screen adjustments of the location and appearance of the displayed ink indicate that at least a portion of the displayed ink is positioned within the range of the displayed content for the executing application, and
  presenting at least the portion of the displayed ink based at least on the off-screen adjustments as an overlay of the displayed content of the executing application.

18. A computing device comprising:
  a display configured to present a user interface;
  an input controller configured to receive inking input to the user interface;
  a processor in communication with the display and the touch controller, the processor configured to:
    receive visual frames from an executing application indicating displayed content for the executing application;

present displayed ink on a first location of the display based on at least an instance of inking input;

detect a change in the displayed content for the executing application based at least on an optical flow analysis of two or more of the visual frames from the executing application;

determine, independent of receipt of any instructions from the executing application, a second location of the displayed ink on the display based at least on the change in the displayed content;

based at least on determining that the second location is outside of a viewable region of the executing application, remove the displayed ink and track an off-screen position of the displayed ink; and based at least on determining that the second location is inside the viewable region of the executing application, present, via the display, the displayed ink in the second location of the display, while removing such displayed ink from the first location.

19. The computing device of claim 18, wherein detecting a change in displayed content provided by the executing application comprises detecting one or more of a pan, zoom, and rotation of at least a portion of the user interface, and wherein presenting the displayed ink in the second location comprises one or more of panning, zooming, and rotating the displayed ink based at least on a type of change detected in the displayed content.

20. The computing device of claim 19, wherein the second location of the display is determined based at least on performing one or more of template matching, optical flow analysis, and feature point detection/matching, including:

determining, for the first frame, a relationship between a location and appearance of 1) one or more points of interest in the first frame, and 2) at least a portion of the displayed ink when the displayed ink is presented as an overlay of the first frame, and adjusting the location and appearance of the displayed ink on the display to maintain the relationship for the second frame when the displayed ink is presented as an overlay of the second frame.

* * * * *